June 25, 1968  KEIICHI TANAKA  3,390,328
INTERFEROMETER FRACTIONAL FRINGE INDICATING DEVICE
FOR SINE WAVE INPUT SIGNAL
Filed July 24, 1964  2 Sheets-Sheet 2

INVENTOR.
Keiichi Tanaka
BY Ernest Montague
Attorney

United States Patent Office 3,390,328
Patented June 25, 1968

3,390,328
INTERFEROMETER FRACTIONAL FRINGE INDICATING DEVICE FOR SINE WAVE INPUT SIGNAL
Keiichi Tanaka, Tokyo, Japan, assignor to Agency of Industrial Science and Technology, Tokyo, Japan, a corporation of Japan
Filed July 24, 1964, Ser. No. 384,889
Claims priority, application Japan, Mar. 27, 1964, 39/16,734
5 Claims. (Cl. 324—83)

ABSTRACT OF THE DISCLOSURE

An interference fringe measuring electric device comprising two identical circuits, each including a phase inverter and an amplitude modulator, a differential amplifying circuit, filters and power amplifiers and output transformers and stator coils, each circuit, respectively, producing modulated carrier signals with amplitudes proportional to the absolute value of the amplitude of an input sinusoidal signal and the phase of the carrier wave signals being changed by 180° when the input sinusoidal signals pass through a reference point for every phase change to create a rotatable alternating magnetic field by combining the modulated signals, the phases of which are different from each other, and a circuit including a constant frequency oscillator and phase adjuster and rotor coils disposed in the magnetic field above-mentioned for indicating the measured fraction of an interference fringe with a resultant rotatable vector produced by the rotatable alternating magnetic field.

The present invention relates to a device in which fractions of interference fringes of light or the Moire fringes created by a diffraction grating can be converted into mechanical angular displacement so that the proposed fractions are, irrespective of the values of the angular displacement, precisely indicated uniformly.

Interferometers and the diffraction gratings are widely used for high precision measurements of mechanical displacement. With most of these systems, measurements are made, with one fringe as the unit of length, by counting the length of the displacement digital with the aforementioned interference or Moire fringes or measurements are made by a method of electrical split with ½ or ¼ of one fringe as the unit of length of said displacement.

However, these measuring techniques can not measure smaller fractions of one fringe in spite of the fact that if such smaller fractions could be measured the interference and Moire fringes could then be used as higher precision standards for length thereby increasing their importance for industrial application.

It is an object of the present invention to provide a conversion device in which input signals, the intensity of which varies according to a sine wave particularly like an interference fringe or Moire fringe, can be indicated on a circular scale with an angle of 360° corresponding to one wave length.

Depending on the application of the converted output, this device can not only measure the aforementioned mechanical displacement but can be used for mechanical positioning with precision, covering less than one fringe of the interference or Moire fringes.

The principle of the present device is to produce modulated carrier signals with amplitudes proportional to the absolute value of the amplitude of the input sinusoidal signals and the phase of the carrier wave signals varying by $\pi$ when the input sinusoidal signals pass through an initial position for every phase change to create a rotatable alternating magnetic field by combining two or three kinds of the modulated signals, the phases of which are different from each other and to rotate the pointer by synchronizing it with the input sinusoidal signals.

It is a feature of the present invention that a device designed in accordance with the present invention can attain its desired purpose with a comparatively simple system of circuits That is, a portion of small patterns of the interference or Moire fringes can be photoelectrically detected simply by picking up a pair of input signals with phases differing from each other by a phase angle of 90°, and therefore, with an optical detector using slits through which there is photoelectrically produced such a pair of signals can be simplified and miniaturized to the utmost extent.

The A.C. amplification for increasing the gain of amplitude is desirable, especially, for the photoelectric detection of the interference fringes which have a low light intensity. In the past, however, it was necessary to modulate the light intensity from the light source, followed by technical complications. It is another object of the present invention to provide a system in which D.C. amplification takes place in the former part of the system and, after such modulation, A.C. amplification takes place, resulting in the advantage of achieving sufficient gain.

It is still another object of the present invention to provide such a system in which when the input sinusoidal signal stops at any optional phase the aforementioned final output indicates an angular displacement corresponding to the phase.

With these and other objects in view which will become apparent in the following detailed description, the present invention will be clearly understood in connection with the accompanying drawings in which.

Figure 1:
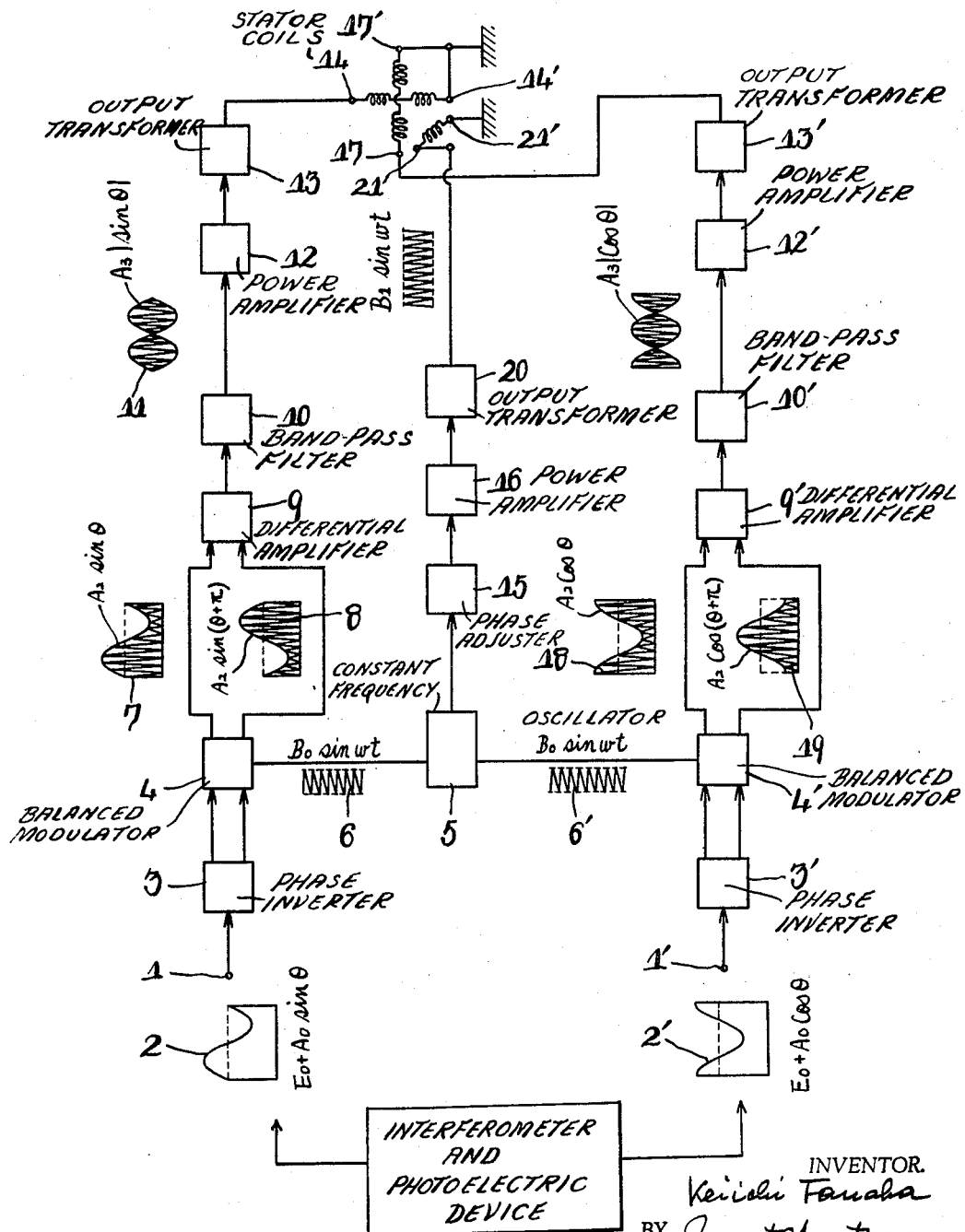
FIGURE 1 is a block system diagram of a fractional indicating device for sinusoidal signals in accordance with the present invention.
Figure 4:
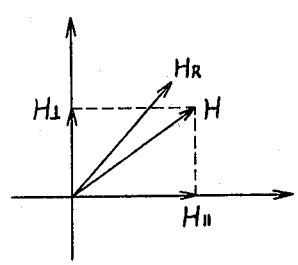
Figure 3:
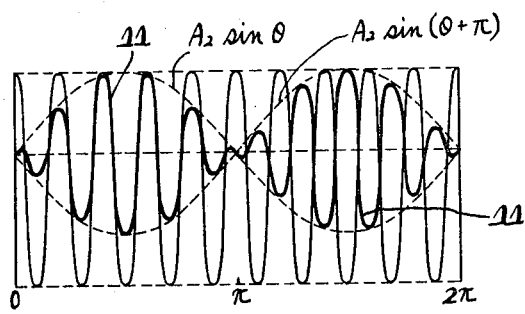
Figure 3:
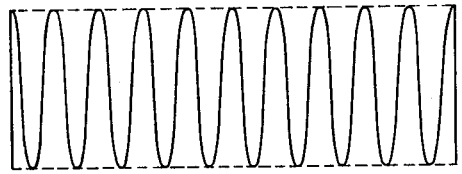

FIGS. 3A and 3B are the signals which are transmitted through the modulating system of FIG. 1; FIG. 3A showing the modulated signal and FIG. 3B showing the unmodulated carrier; and FIG. 4 is a vector diagram showing the relationship of the alternative magnetic field as generated by the device, the magnitude and phase of the rotatable resultant vector of the resultant alternating magnetic field and the rotor coil.

Referring now to the drawings, and more particularly to FIG. 1, input terminals 1 and 1' are provided for receiving sinusoidal signals 2 and 2', namely, $E_0+A_0 \sin \theta$ and $E_0+A_0 \cos \theta$, respectively. $E_0$ is the bias current or voltage. The photoelectric output signals of the interference or Moire fringes are approximated in this shape, that is by the above sinusoidal signals which are phase displaced by $\pi/2$ due to light from the fringe pattern taken from two different portions spaced $\pi/2$ apart. A phase inverter 3 and 3' is provided by which the input signals from the terminal 1 are converted into signals $E_0+A_0 \sin \theta$ and $E_0+A_0 \sin (\theta+\pi)$ inverted from one another, which enter balanced modulators 4 and 4'. A constant-frequency oscillator 5 is provided generating the carrier-wave 6 of the form $B_0 \sin \omega t$.

Figure 2:
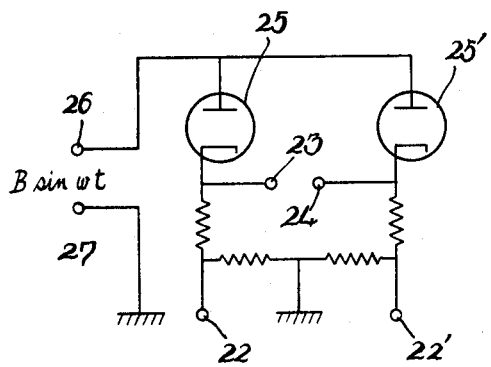
FIG. 2 is an embodiment of the circuit which is a component of the present device.

Referring now again to the drawings and more particularly to FIG. 2, the balanced modulator circuits 4 and 4' are illustrated, which consist of two diodes 25 and 25'. Further referring also to FIG. 1, if input terminals 26 and 27 are applied with the carrier wave $B_0 \sin \omega t$, and if at the same time, the input terminals 22 and 22' on the cathode side are applied with the outputs $E_1+A_1 \sin (\theta+\pi)$ and $E_1+A_1 \sin \theta$ of the phase-inverter 3, then the modulated waves 7 and 8 (FIG. 1) are generated in output terminals 23 and 24. The modulated waves usually have the envelopes $A_2 \sin \theta$ and $A_2 \sin (\theta+\pi)$, and the carrier waves have similar phases. Also, the modulated waves are differentially amplified by the differential amplifying circuit 9. Band pass filter 10 has a center frequency of $\omega/2\pi$, and illustrated in FIG. 3A is one of the modulated waves 11 which has been differentially amplified and formed by the above-mentioned filter.

Namely, the thin solid line shows the carrier wave $\sin \omega t$, the dashed lines show the envelopes of the outputs 7 and 8 of the balanced modulators and the thick solid line shows the output 11 in FIG. 1 of the filter 10 through the balanced modulator. The modulated waves can be formulated below by dividing the value $\theta$ into two ranges of $0 \sim \pi$ and $\pi \sim 2\pi$.

$$\theta = 0 \sim \pi: \quad |A_3 \sin \theta| \sin \omega t \quad (1)$$
$$\theta = \pi \sim 2\pi: \quad |A_3 \sin \theta| \sin(\omega t + \pi) \quad (2)$$

In FIG. 1, the modulated signal 11 passes through the power amplifier 12 and the output transformer 13, enters the stator coils 14 and 14' of the synchro-resolver, and creates an alternating magnetic field $H_\perp$ as follows.

$$\theta = 0 \sim \pi: \quad H_\perp = H_A |\sin \theta| \sin \omega t \quad (3)$$
$$\theta = \pi \sim 2\pi: \quad H_\perp = -H_A |\sin \theta| \sin \omega t \quad (4)$$

$H_A$ is a constant. These two formulae can be, mathematically, represented by the following formula covering the whole range of $\theta$.

$$H_\perp = H_A \sin \theta \sin \omega t \quad (5)$$

Another similar modulating system is positioned in parallel with the aforementioned (on the right-hand side of FIG. 1), and having like elements denoted by identical but primed numbers, and comprises a phase inverter 3' through an output transformer 13' (explanation of the circuits being as above-described in connection with the left-hand circuits of FIG. 1) to which are applied the sine input signal $E_0 + A_0 \cos \theta$ having a phase which is $\pi/2$ different from the phase of the above signal. The modulated signals 18 and 19 as split pass through the differential amplifying circuit 9' and are converted into signals containing $\cos \theta$ which correspond to Formulae 1 and 2, and which are sent to the stator coils 17 and 17' of the synchro-resolver, and create the alternating magnetic field $H_\parallel$ which corresponds to Formulae 3 and 4. Then, they can be converted corresponding to Formula 5, covering the whole range of $\theta$ as follows.

$$H_\parallel = H_A \cos \theta \sin \omega t \quad (6)$$

The stator coils 14, 14' and 17, 17' cross each other at right angles. Therefore the values of H, the magnitude of the vector of the alternative field in which the Formulae 5 and 6 are components crossing each other at right angles as shown in FIG. 4, and $\phi$, the phase angle, can be obtained as follows:

$$H = \sqrt{H_\perp^2 + H_\parallel^2} = H_A \sin \omega t \quad (7)$$

$$\tan \phi = \frac{H_\perp}{H_\parallel} = \tan \theta \quad \therefore \phi = \theta \quad (8)$$

From the above, it follows that the resultant vector represents the alternating magnetic field which has an angular displacement with a phase synchronized with the phase of the input sinusoidal signal.

On the other hand, the sinusoidal waves generated from the oscillator 5 also pass through a phase-adjuster 15, into power amplifier 16 and then through output transformer 20 enter rotor coils 21 and 21' of the synchro-resolver, creating the following alternative magnetic field $H_R$.

$$H_R = H_B \sin \omega t \quad (9)$$

If the angle, as shown in FIG. 4, between the rotor coil axis and the resultant alternating magnetic field vector H in the Formula 7 is denoted as $\delta$, then the rotor is subjected to the magnetic torque T, an amount of which can be calculated as below from the aforementioned Formulae 7 and 9.

$$T = K \cdot H \cdot H_R \sin \delta$$
$$= K \cdot H_A \cdot H_B \sin^2 (\omega t) \sin \delta \quad (10)$$

in which K is a constant. The rotor always rotates to hold the condition $\delta = 0$, indicating the phase $\theta$ of the input sinusoidal wave signal.

One wave length of the sinusoidal signal according to the present device is equal to the 360° angular displacement of the rotor, therefore, the angular resolution scale of the present invention can be used to interpolate any amount less than 1 wave length.

The example of the application illustrated herein shows that the device having two modulating lines, is used on the synchro-resolver which creates orthogonal magnetic fields with the inputs of two sinusoidal signals having a phase difference of 90°. The same result as in this example can be obtained also using three modulating lines which have any other than the modulating circuits, using three kinds of sinusoidal wave input signals which have a phase difference of 120° among them, and applying three kinds of modulated output signals to the stator coils of general-type selsyn motor and the carrier to the rotor coils of the same motor.

Also, the example of application herein is one in which the resultant vector is followed by the magnetic torque acting directly on the rotor, but it is possible to make the rotor follow the resultant alternating magnetic field by detecting the abovementioned angle $\delta$ between the resultant alternative magnetic field H and the rotor coil field $H_R$ as the induction voltage in the rotor coil and by driving the servo-motor.

In case the present invention is applied to interference or Moire fringes, variations on the source of light do not impair its function since a D.C. differential amplifying circuit is inserted in the first part each of the input terminals 1 and 1', applying one of the terminals with the input signals 2 and 2' and the other one with portion of the rays of the light source lamp with the interference or Moire fringes as the D.C. input signals, and effecting differential amplification on same.

While I have disclosed several embodiments of the present invention, it is to be understood that these embodiments are given by example only and not in a limiting sense, the scope of the present invention being determined by the objects and the claims.

I claim:
1. An interference fringe measuring device comprising:
   interferometer means for producing a pattern of substantially sinusoidal varying fringes composed of a pattern alternating bright and dark parallel fringes spaced at equal intervals and adapted to move said fringes in relation to a mechanical displacement;
   photoelectric means for converting the light from portions of said fringes into a sinusoidal wave input signal and a cosine wave input signal, respectively;
   a constant frequency oscillator means;
   a sinusoidal wave amplitude modulating circuit comprising,
      a first phase inverter means for receiving said sinusoidal wave input signal and for inverting and splitting said sinusoidal wave input signal,
      a first balanced modulator means for receiving said inverted and split sinusoidal wave input signal,
      said oscillator means for feeding a carrier signal to said first balanced modulator means,
      said first balanced modulator means for modulating said carrier signal with said inverted and split sinusoidal signal to produce first modulated signals,
      a first differential amplifier for receiving said first modulated signals and for differentially amplify- ing said first modulated signals into a modulated sinusoidal wave signal;

a cosine wave amplitude modulating circuit comprising,
  a second phase inverter means for receiving said cosine wave input signal and for inverting and splitting said cosine wave input signal,
  a second balanced modulator means for receiving said inverted and split cosine wave input signal,
  said oscillator means for feeding said carrier signal to said second balanced modulator means,
  said second balanced modulator means for modulating said carrier signal with said inverted and split cosine wave signal to produce second modulated signals,
  a second differential amplifier for receiving said second modulated signal and for differentially amplifying said second modulated signals into a modulated cosine wave signal;

two stator coil means disposed perpendicularly to each other,
  one of said stator coil means for receiving said modulated sinusoidal wave signal,
  the other of said coil means for receiving said modulated cosine wave signal,
  said stator coil means thereby generating a resultant rotary vector of a composite alternate magnetic field;

a phase-adjustor means for receiving a constant frequency signal from said constant frequency oscillator means; and a rotatable rotor coil means disposed in said composite alternate magnetic field for receiving said constant frequency signal from said phase-adjustor, thereby creating a magnetic field causing said rotatable rotor coil to track said rotary vector, thereby indicating the phase angle of said sinusoidal wave input signal.

2. The device, as set forth in claim 1, wherein said first phase inverter means generates two sinusoidal wave signals phase-inverted relative to each other, one of which has the same phase as that of said sinusoidal wave input signal,
first filter means for filtering said modulated sinusoidal wave signal, and
said resultant rotary vector composed in part of said modulated sinusoidal wave signal after being filtered.

3. The device, as set forth in claim 2, wherein said second phase inverter means generating two cosine wave signals phase inverted relative to each other, one of which has the same phase as that of said cosine wave input signal,
second filter means for filtering said second modulated cosine wave signal, and
said resultant rotary vector composed in part of said second modulated cosine wave signal after filtering.

4. An interference fringe measuring electric device comprising:
interferometer means for producing a pattern of substantially sinusoidally varying fringes composed of a pattern alternating bright and dark parallel fringes spaced at equal intervals and adapted to move said fringes in relation to a mechanical displacement;
photoelectric means for converting the light from portions of said fringes into a sine wave input signal and a cosine wave input signal, respectively;
first means including a pair of phase inverter means, one generating a pair of sine wave signals phase inverted with respect to each other and the other generating a pair of cosine wave signals phase inverted with respect to each other from said sine wave input signal and said cosine wave input signal, respectively, derived from said interference fringe pattern,
second means comprising a constant high frequency sinusoidal-wave oscillator for generating a constant high frequency carrier signal,
third means for modulating said carrier signal by said pair of sine wave signals and independently modulating said carrier signal by said pair of cosine wave signals,
fourth means for independently amplifying the difference between said pair of sine modulated carrier signals and for amplifying the difference between said pair of cosine modulated signals,
fifth means for independently filtering only said modulated carrier signals,
sixth means for generating a resultant electromagnetic rotatable vector composed of said sine modulated and cosine modulated carrier signals after being filtered,
seventh means for compensating the phase of said constant high-frequency signal generated from said constant high-frequency sinusoidal wave oscillator to produce a phase-compensated carrier signal, and
eighth means for generating an electromagnetic vector by said phase-compensated carrier signal in the magnetic field of said resultant electromagnetic rotatable vector to indicate the fraction of an interference fringe by measuring the phase difference between an initial position and a final position of a displaced interference fringe pattern.

5. An interference measuring device comprising:
interferometer means for producing a pattern of substantially sinusoidal varying fringes composed of a pattern of alternating bright and dark parallel fringes spaced at equal intervals and adapted to move said fringes in relation to a mechanical displacement;
photoelectric means for converting the light from portions of said fringes into three sinusoidal wave input signals having phase differences of 120° relative to each other;
a constant frequency oscillator means;
three sinusoidal wave amplitude modulating circuits each comprising
  a phase inverter means for receiving one of said sinusoidal wave input signals and for inverting and splitting said one of said sinusoidal wave input signals,
  a balanced modulator means for receiving said inverted and split sinusoidal wave input signal,
  said oscillator means for feeding a carrier signal to said first balanced modulator means,
  said balanced modulator means for modulating said carrier signal with said inverted and split sinusoidal signal to produce modulated signals,
  a differential amplifier for receiving said modulated signals and for differentially amplifying said modulated signals into a modulated sinusoidal wave signal; and
coil means including coils crossing each other at 120° for forming from said modulated sinusoidal wave signals, respectively, from each of said sinusoidal wave amplitude modulating circuits, a rotatable vector of a resultant alternating magnetic field, and
  a rotatable rotor coil means for following said rotatable vector.

References Cited
UNITED STATES PATENTS

| | | | |
|---|---|---|---|
| 2,869,415 | 1/1959 | Kaye | 324—83 |
| 2,880,391 | 3/1959 | Norton | 324—83 |
| 2,882,786 | 4/1959 | Kaye | 324—83 |
| 3,020,478 | 2/1962 | Rogoff | 324—82 |
| 3,054,053 | 9/1962 | Cook | 324—82 |
| 3,123,769 | 3/1964 | Meyer | 324—82 |
| 3,253,223 | 5/1966 | Kettell | 324—83 |
| 3,271,676 | 9/1966 | Chitayat | 324—83 |

RUDOLPH V. ROLINEC, *Primary Examiner.*

P. F. WILLE, *Assistant Examiner.*